(12) United States Patent
Marcon

(10) Patent No.: US 9,031,785 B2
(45) Date of Patent: May 12, 2015

(54) SYSTEM AND METHOD FOR AIRCRAFT NAVIGATION ASSISTANCE

(71) Applicant: Dassault Aviation, Paris (FR)

(72) Inventor: Pierre Marcon, Meudon (FR)

(73) Assignee: Dassault Aviation, Paris (FR)

( * ) Notice: Subject to any disclaimer, the term of this patent is extended or adjusted under 35 U.S.C. 154(b) by 0 days.

(21) Appl. No.: 14/174,728

(22) Filed: Feb. 6, 2014

(65) Prior Publication Data

US 2014/0229100 A1 Aug. 14, 2014

(30) Foreign Application Priority Data

Feb. 8, 2013 (FR) ...................................... 13 00288

(51) Int. Cl.
*G01C 21/00* (2006.01)
*G01C 21/12* (2006.01)
*G01C 21/16* (2006.01)
*G01S 19/49* (2010.01)

(52) U.S. Cl.
CPC .............. *G01C 21/12* (2013.01); *G01C 21/165* (2013.01); *G01S 19/49* (2013.01)

(58) Field of Classification Search
None
See application file for complete search history.

(56) References Cited

U.S. PATENT DOCUMENTS

| 5,420,592 | A | * | 5/1995 | Johnson | 342/357.46 |
|---|---|---|---|---|---|
| 5,719,764 | A | * | 2/1998 | McClary | 700/79 |
| 5,923,286 | A | * | 7/1999 | Divakaruni | 342/357.44 |
| 5,969,668 | A | * | 10/1999 | Young, Jr. | 701/470 |
| 6,122,595 | A | * | 9/2000 | Varley et al. | 701/469 |
| 6,178,363 | B1 | * | 1/2001 | McIntyre et al. | 701/16 |
| 6,195,040 | B1 | * | 2/2001 | Arethens | 342/357.25 |
| 6,239,745 | B1 | * | 5/2001 | Stratton | 342/410 |
| 6,317,688 | B1 | * | 11/2001 | Bruckner et al. | 701/472 |
| 6,424,914 | B1 | * | 7/2002 | Lin | 701/470 |
| 6,549,829 | B1 | * | 4/2003 | Anderson et al. | 701/16 |
| 6,697,736 | B2 | * | 2/2004 | Lin | 701/472 |
| 7,193,559 | B2 | * | 3/2007 | Ford et al. | 342/357.32 |
| 7,409,289 | B2 | * | 8/2008 | Coatantiec et al. | 701/472 |
| 7,447,590 | B2 | * | 11/2008 | Arethens | 701/471 |
| 7,848,883 | B2 | * | 12/2010 | Fetzmann et al. | 701/507 |
| 7,911,380 | B2 | * | 3/2011 | Petillon | 342/357.3 |
| 7,962,255 | B2 | * | 6/2011 | Krogh et al. | 701/5 |

(Continued)

FOREIGN PATENT DOCUMENTS

| FR | 2866423 | 8/2005 |
|---|---|---|
| FR | 2898196 | 9/2007 |

OTHER PUBLICATIONS

Italian Search Report for Application No. 1300288 dated Oct. 25, 2013.

*Primary Examiner* — Jonathan M Dager

(57) ABSTRACT

This aircraft navigation assistance system comprises an inertial navigation module adapted for providing first positional information from accelerometric and gyrometric measurements, and a module adapted for determining second positional information from satellite positioning data. The system is characterized in that it comprises means for estimating a first localization of the aircraft at a time of estimation on the basis of first positional information determined from accelerometric and gyrometric measurements at said time of estimation and second positional information determined from positioning data received prior to said time of estimation, said first localization being determined independently from any positioning data received in a time interval preceding said time of estimation, advantageously equal to a time to alert.

11 Claims, 4 Drawing Sheets

(56) References Cited

U.S. PATENT DOCUMENTS

| | | | |
|---|---|---|---|
| 7,970,503 B2* | 6/2011 | Lapp et al. | 701/17 |
| 8,190,310 B2* | 5/2012 | Coulmeau et al. | 701/15 |
| 8,311,728 B2* | 11/2012 | Coatantiec et al. | 701/472 |
| 8,442,703 B2* | 5/2013 | Petillon | 701/3 |
| 8,447,520 B2* | 5/2013 | Cortiella et al. | 701/518 |
| 8,566,033 B2* | 10/2013 | Clemenceau et al. | 701/469 |
| 8,755,995 B2* | 6/2014 | Haas et al. | 701/478 |
| 2001/0020214 A1* | 9/2001 | Brenner | 701/213 |
| 2003/0083792 A1* | 5/2003 | Anderson et al. | 701/16 |
| 2004/0239560 A1* | 12/2004 | Coatantiec et al. | 342/357.14 |
| 2005/0093739 A1* | 5/2005 | DiLellio | 342/357.06 |
| 2007/0205941 A1* | 9/2007 | Riley et al. | 342/357.12 |
| 2009/0069960 A1* | 3/2009 | Lapp et al. | 701/16 |
| 2011/0084877 A1* | 4/2011 | Rodriguez et al. | 342/357.44 |
| 2011/0122022 A1* | 5/2011 | Van Den Bossche et al. | 342/357.58 |
| 2013/0079958 A1* | 3/2013 | Neri et al. | 701/16 |

* cited by examiner

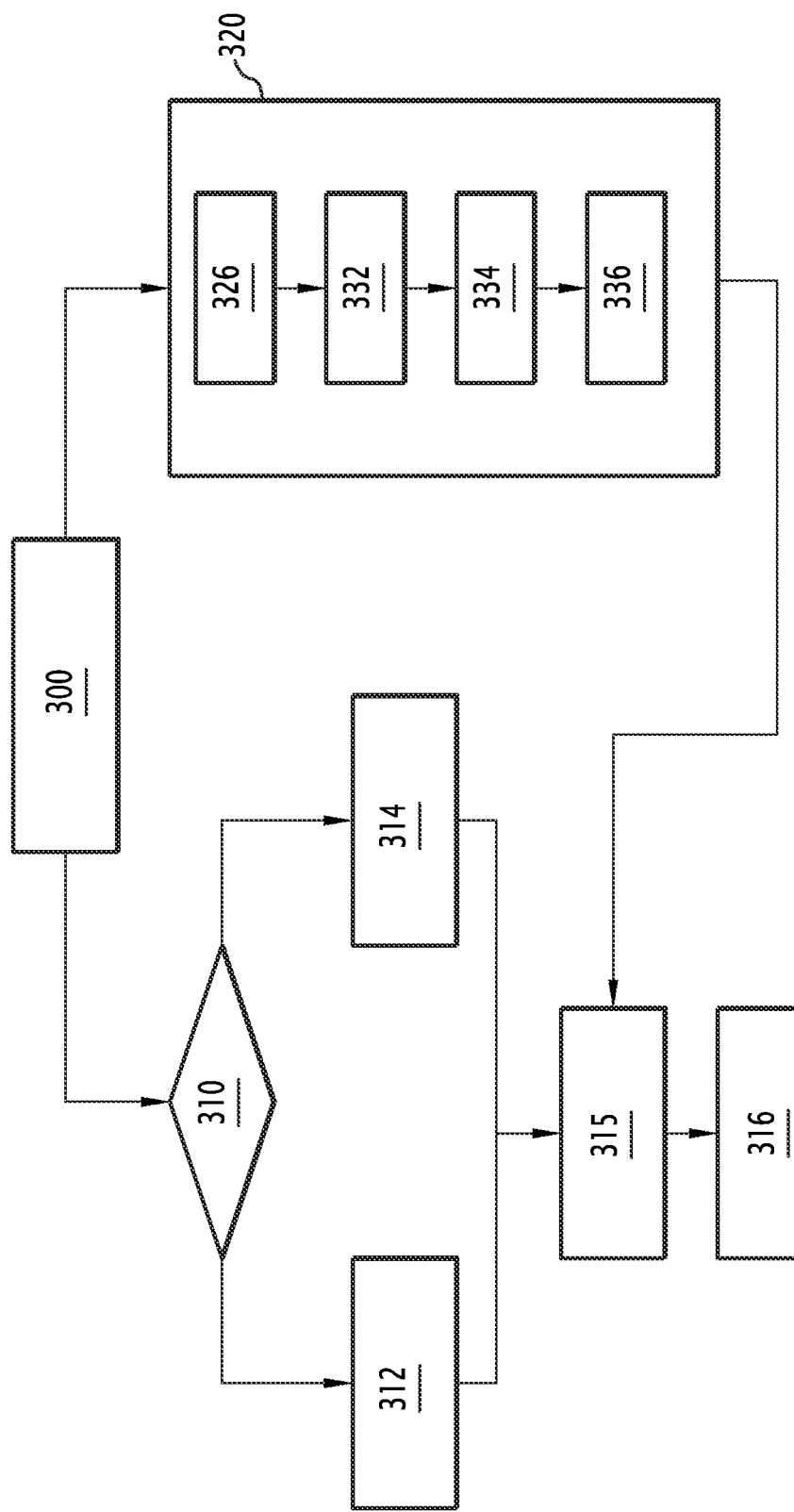

SYSTEM AND METHOD FOR AIRCRAFT NAVIGATION ASSISTANCE

CROSS-REFERENCE TO RELATED APPLICATIONS

This application claims benefit of French patent application number FR13 00288, filed Feb. 8, 2013, which is herein incorporated by reference.

BACKGROUND OF THE INVENTION

1. Field of the Invention

This invention relates to a navigation assistance system for use on board an aircraft, comprising an inertial navigation module adapted for providing first aircraft positional information resulting at least partially from accelerometric and gyrometric measurements, and a satellite positioning module comprising at least one satellite navigation data receiver, said positioning module being adapted for determining second aircraft positional information from satellite positioning data received by said satellite navigation data receiver.

In particular, it is applicable to aiding in guidance of an aircraft during critical phase of flights, such as takeoff, final approach, or landing. Guidance of an aircraft during such phase of flights requires high precision aircraft localization information, but also a short time to alert (or TTA).

Time to alert is to designate the maximum time interval between receipt of signals providing degraded precision and reporting the degradation of such precision to the user. This time to alert must be as short as possible so that degradation of precision can be reported to the user as fast as possible.

2. Description of the Related Art

Guidance of an aircraft during approach and landing phases is generally done by means of an instrument landing system, or ILS. This radio navigation system is capable of providing high precision approaches. E.g., an ILS of category I (ILS Cat I) is capable of reaching decision levels of 200 feet (i.e., 61 m). However, such systems require multiple antennae and beacons to be available on the ground around the landing strip.

Such guidance can be replaced by guidance based on a satellite navigation system. Herein, a satellite navigation system is a system dedicated to navigation of the GNSS (Global Navigation Satellite System) type, such as GPS (Global Positioning System) or GLONASS.

In a known manner, such systems are based on a receiver receiving radiofrequency signals emitted by satellites of a satellite constellation, and the receiver determining from each signal received a distance between the receiver and the satellite transmitter of the signal so as to infer the position of the receiver therefrom.

Precision of such navigation systems is affected by several error types, in particular atmospheric errors, satellite timing and orbit errors, and errors due to multipath interference of the signals.

For correcting some of these errors, it is known to couple GPS or GLONASS satellite navigation systems to an SBAS-type space-based augmentation system. This is for instance EGNOS (Geostationary Navigation Overlay Service) or WAAS (Wide Area Augmentation System).

Associating the spatial augmentation system with GPS allows for more precise positional information (up to one meter horizontally and two meters vertically) to be obtained which is more reliable than that obtained by GPS only.

In particular, the spatial augmentation system has redundancies allowing for data degradation of GPS, GLONASS, or SBAS to be identified and reported to the user within six seconds.

Such an association allows for powerful so-called LPV (Localizer Performance with Vertical guidance) approaches to be obtained, with decision levels from 250 to 200 feet, i.e., approximately 76 to 61 meters, thus comparable to those of an ILS Cat I, without however requiring the installation of antennae and ILS beacons in close proximity to the landing strips.

The spatial augmentation system, coupled to GPS, provides both positional information and associated protection limits, warranting for horizontal and vertical precision given by the system. When precision of positional information decreases, protection limits will increase. This increase is reported to the user at a maximum of six seconds after degradation of precision occurred, this duration corresponding to the system's time to alert.

Moreover, when at least one of these protection limits exceeds a minimum precision predefined as an alert limit, a warning signal is emitted to the user.

Such a delay between the degradation of precision and reporting thereof to the user means that during this time of six seconds, the guiding system could broadcast erroneous aircraft positional information which is not compatible with the user's performance requirements, without the user being warned. However, in the course of final approach, takeoff, or landing guidance, such errors may lead to dangerous situations if detected belatedly.

SUMMARY OF THE INVENTION

Thus, it is an object of the invention to overcome such shortcomings.

For this purpose, the object of the invention is a system of the type mentioned above, characterized in that it comprises estimation means adapted for estimating a first localization of the aircraft at a given time of estimation, on the basis of:
  first aircraft positional information, resulting at least partially from accelerometric and gyrometric measurements at said time of estimation; and
  second aircraft positional information, determined from satellite positioning data received by said satellite navigation data receiver prior to said time of estimation,
  said first localization being determined independently from any satellite positioning data received in a predetermined time interval preceding said time and including said time of estimation, said predetermined time interval being advantageously equal to a time to alert, in particular of the satellite positioning module.

According to other aspects of the invention, the system comprises one or more of the following characteristics:
  said satellite positioning module comprises means for validating or invalidating said satellite positioning data, depending on the precision of said satellite positioning data, and/or depending on an operating mode of said satellite positioning module;
  the second aircraft positional information includes an estimate of a position of the aircraft at least at one given time of determination, and an estimate of the precision of said position, determined from satellite positioning data, and said satellite positioning module is adapted for comparing the estimate of the precision of said position to a minimum precision required at said time of determination, and validating said satellite positioning data, at a validation time after said time of determination, if the estimate of the precision of said position is in accordance with said required minimum precision, the time interval between said time of determination and said validation time being smaller or equal to said time to alert;

said first localization is determined independently from any satellite positioning data which has not been validated by said satellite positioning module;

the system includes a unit for storing a previously recorded deviation between first aircraft positional information and second aircraft positional information, adapted for storing said deviation at least between said earlier time and said time of estimation, and said estimation means is adapted for determining said first localization of the aircraft at said given time of estimation:

depending on the deviation recorded at said earlier time if said satellite positioning data at said earlier time is validated, or depending on a deviation recorded at the last time for which satellite positioning data has been validated, if said satellite positioning data at said earlier time is not validated, the system includes a unit for storing a deviation recorded at an earlier time between second aircraft positional information and a first localization determined at said earlier time by said estimation means, said unit for storing being adapted for storing said deviation at least between said earlier time and said time of estimation, and said estimation means is adapted for determining said first localization of the aircraft at said time of estimation:

depending on the deviation recorded at said earlier time if said satellite positioning data at said earlier time is validated, or depending on a deviation recorded at the last time for which satellite positioning data has been validated, if said satellite positioning data at said earlier time is not validated;

said estimation means is adapted for determining a second localization of the aircraft at a time of estimation on the basis of hybridization between:

first aircraft positional information resulting at least partially from accelerometric and gyrometric measurements at said time of estimation, and second aircraft positional information determined from satellite positioning signals received by said satellite navigation data receiver at said time of estimation;

the system includes a selection module adapted for determining an enhanced-reliability localization of the aircraft, at a time of estimation associated with a predetermined requirement of responsiveness, said localization with enhanced reliability being:

equal to said first localization if said time to alert is not in accordance with said requirement of responsiveness, equal to said second localization if said time to alert is in accordance with said requirement of responsiveness;

said satellite positioning module comprises means for receiving differential positioning signals and signals from an SBAS-type system for increasing the precision of positioning;

said first localization of the aircraft is estimated on the basis of hybridization between said first aircraft positional information and said second aircraft positional information.

Also an object of the invention is a method of aircraft navigation assistance, characterized in that it comprises, at least in a first phase of flight of the aircraft, a step of estimating a first localization of the aircraft at a given time of estimation, comprising:

a phase of determining first aircraft positional information, resulting at least partially from accelerometric and gyrometric measurements of an inertial navigation center at said time of estimation, a phase of determining second aircraft positional information from satellite positioning data received by a satellite navigation data receiver prior to said time of estimation, a phase of estimating said first localization of the aircraft on the basis of said first and second positional information, said first localization being estimated independently from any satellite positioning data received in a predetermined time interval preceding said time of estimation and including said time of estimation, said predetermined time interval being advantageously equal to the time to alert.

According to other aspects of the invention, the method includes one or more of the following characteristics:

the method includes a step of validating said satellite positioning data, depending on precision of said satellite positioning data and/or depending on an operating mode of said satellite positioning module;

the phase of determining second positional information includes an estimate of a position of the aircraft at least at a given time of determination and an estimate of the precision of said position, from said satellite positioning data, and said step of validating includes a phase of comparing the estimate of the precision of said position to a minimum precision required at said time of determination, said satellite positioning data being validated, at a later validation time at said time of determination, if and only if the estimate of the precision of said position is in accordance with said minimum precision required, the time interval between said time of determination and said validation time being less or equal to said time to alert;

said first localization is determined independently from any satellite positioning data which has not been validated;

the method includes, in at least one second phase of flight of the aircraft, a step of estimating a second localization of the aircraft at a time of estimation, on the basis of hybridization between:

first aircraft positional information resulting at least partially from accelerometric and gyrometric measurements at said time of estimation, and second aircraft positional information determined from satellite positioning signals received by said satellite navigation data receiver at said time of estimation.

BRIEF DESCRIPTION OF THE DRAWINGS

The invention will be better understood from reading the following description, given only by way of example and made with reference to the appended drawings.

FIG. 3 is a functional diagram illustrating the structure of the management system according to the invention.

FIG. 4 is a synoptic diagram of a navigation assistance method implemented by the system of FIG. 3.

DETAILED DESCRIPTION

Figure 1:
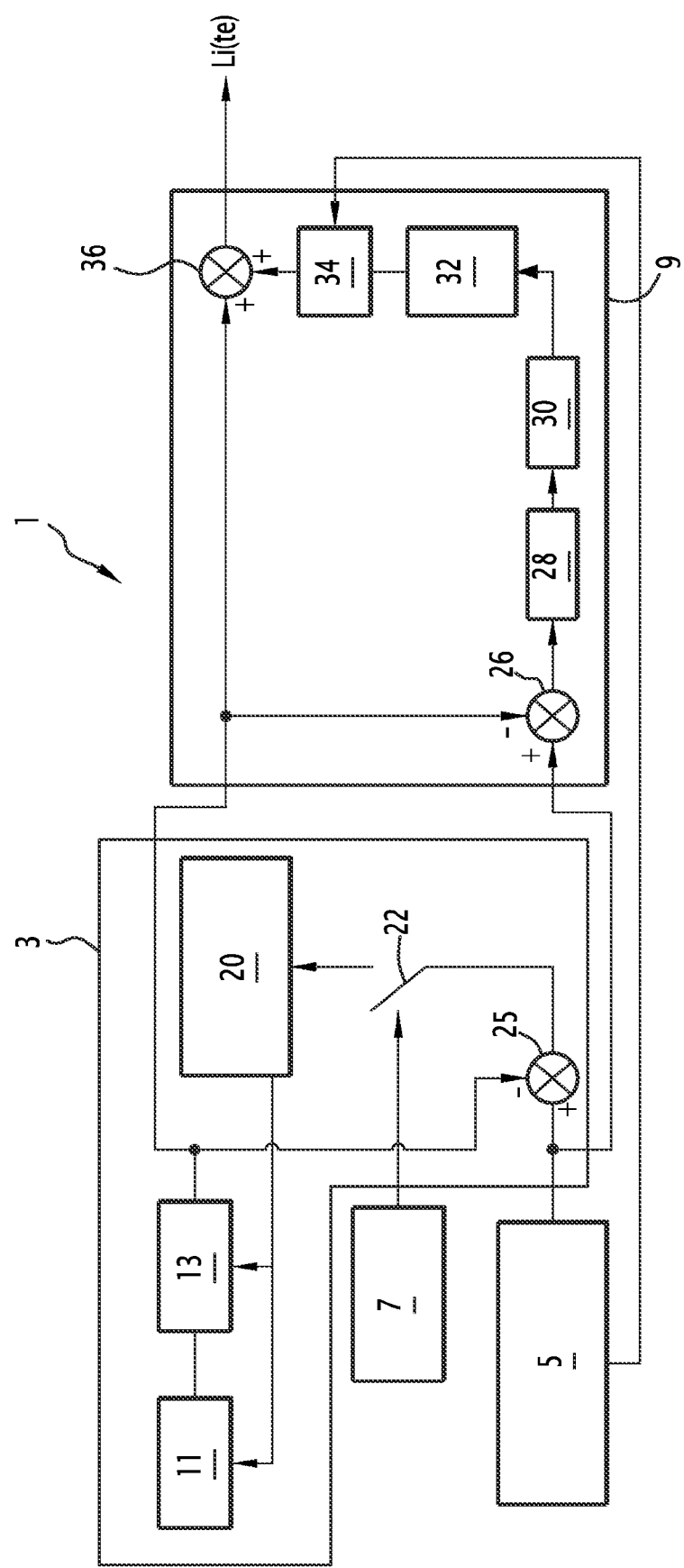
FIG. 1 is a diagram of a navigation assistance system according to a first embodiment of the invention.

FIG. 1 schematically shows a navigation assistance system 1 according to a first embodiment of the invention for use on board an aircraft.

The system 1 comprises an inertial navigation center 3, a satellite positioning module 5, a selection module 7, and a localization module 9.

The inertial navigation center 3 is adapted for providing first aircraft positional information resulting at least partially from accelerometric and gyrometric measurements.

For this purpose, the navigation center 3 comprises accelerometric and gyrometric sensors 11.

The sensors 11 include several accelerometers, typically three, of fixed orientation with respect to the aircraft, adapted for providing non gravitational acceleration values of the aircraft according to these axes.

These sensors 11 further comprise several gyrometers, typically three, each having an axis which is fixed with respect to the aircraft, and adapted for providing values of angular velocity about these axes.

The navigation center 3 further comprises a computer 13. The computer 13 is configured to determine first geographic position and velocity information of the aircraft from accelerometric and gyrometric measurements from sensors 11.

In particular, the computer 13 is configured to determine a position $p_i(t)$ of the aircraft at any time t from the position thereof at an earlier time $t_0$, by integrating accelerometric and gyrometric measurements from sensors 11 between times $t_0$ and t, and from a correction applied to such information. This correction is intended to improve precision of the determined position with respect to a position estimated from inertial data only.

Hereafter, such first positional information will be designated as inertial data.

The satellite positioning module 5 is adapted for receiving positioning signals emitted by a satellite system, and determining second aircraft positional information, hereafter designated as GPS data, from such signals.

The positioning module 5 comprises one or more receivers adapted for receiving both signals emitted by satellites of a satellite positioning system GNSS, such as GPS, and spatial augmentation signals emitted by satellites of an SBAS-type augmentation system.

Hereafter, it will be assumed that the satellite positioning system is GPS, and thus, signals emitted by the satellites of this system will be called GPS signals. Furthermore, the signals of spatial augmentation will be called SBAS signals.

SBAS signals, which are different from GPS signals, include a set of corrections intended to improve performance of the satellite positioning system, in particular precision and reliability of the positional information determined from the GPS signals.

The positioning module 5 is configured to infer from the GPS signals and SBAS signals emitted at a given time t, geographic positioning of the aircraft $p_{GPS}(t)$, expressed by means of three coordinates (e.g., latitude and longitude in the reference geoid WGS84 as well as the altitude above this reference geoid), and hereafter called GPS position, as well as the protection limits associated with this GPS position.

The protection limits conventionally include the minimum vertical precision (VPL) and the minimum horizontal precision (HPL) ensured. Such protection limits are a function of the precision of the GPS and SBAS data received by the module 5. When precision of the GPS position decreases, the protection limits will increase.

Furthermore, the positioning module 5 is adapted for detecting a degradation of this precision, and warning the user of this degradation by means of a warning signal. Degradation of the precision is for instance a minimum vertical precision VPL greater than a vertical alert limit, designated as VAL, and/or a minimum horizontal precision HPL greater than a horizontal alert limit, designated as HAL.

This warning signal is emitted within the so-called time to alert, and designated as TTA. The time to alert TTA is for instance six seconds when the GPS system is in optimal operating mode. Thus, a given time to alert TTA, e.g. of six seconds, is guaranteed only in this optimal operating mode.

This delay is equal to the time interval elapsing between time t for which a degraded-precision position of the aircraft is determined, and the later time at which the degradation of precision is reported.

Thus, aircraft positional information at a time t from the positioning module 5 is only validated by this positioning module 5 after a time interval equal to the time to alert, at a time t+TTA.

Aircraft positional information at a time t is thus waiting for validation during the time interval comprised between time t and time t+TTA, and is then validated or invalidated at time t+TTA, depending on the precision thereof.

Namely, if the minimum vertical precision VPL of GPS data at time t is greater than the vertical alert limit VAL, and/or if the minimum horizontal precision HPL of GPS data at time t is greater than the horizontal alert limit HAL, GPS data at time t will be invalidated at time t+TTA.

According to the invention, the localization of the aircraft at a given time can be determined according to two distinct modes of computation.

Selection module 7 is adapted for selecting, at each time, depending on the phase of flight of the aircraft at this time, which of such modes of computation is to be applied.

The choice of either of such modes depends on the conformity of the time to alert TTA of the positioning module 5 with an upper limit of time to alert acceptable at this moment.

This upper limit corresponds to the maximum duration for which it is tolerated that a localization with an error greater than a predefined limit is given to the user without warning.

This upper limit generally depends on the phase of flight of the aircraft at the time considered. In particular, when in cruise phase, a time to alert of six seconds is acceptable, this time to alert appears to be too long during takeoff, approach, or landing phases.

Selection module 7 is thus adapted for determining at each time, depending on the phase of flight of the aircraft, if the time to alert at this moment is acceptable or if a shorter time to alert is required, so as to infer which mode of computation of the aircraft's position is to be adopted.

If the time to alert of the positioning module 5 is too long for the current phase of flight, i.e., if this time to alert is not acceptable, selection module 7 is adapted for triggering the determination of the localization of the aircraft on the basis of a first mode of computation. Hereafter, the localization of the aircraft determined on the basis of this first mode will be called "first localization" and designated as $L_1(t)$.

On the contrary, if the time to alert of positioning module 5 is acceptable, selection module 7 is adapted for triggering the determination of the localization of the aircraft on the basis of a second mode of computation. Hereafter, this localization of the aircraft will be called "second localization" and designated as $L_2(t)$.

System 1 is adapted for determining a localization of the aircraft at each time from inertial data from the computer 13 and GPS data from the satellite positioning module 5, depending on the mode of computation chosen by selection module 7.

According to the first and second modes of computation, the localization of the aircraft at time t is determined on the basis of inertial data and GPS data.

Indeed, while inertial data is precise in the short term, but will drift over time, GPS data is noisier but has time-limited error.

Thus, the combination of both types of data allows both for correcting errors of inertial data by means of GPS data, and correcting errors of the positioning module 5 by means of inertial data.

According to the first mode of computation, the first localization $L_1(t_e)$ of the aircraft is determined at a given time of estimation $t_e$ on the basis of the inertial data at this moment $t_e$, and a correction $C_1(t_e)$ determined from a deviation $e(t_a)$ determined at an earlier time $t_a$, between the GPS position $p_{GPS}(t_a)$ and the inertial position $p_i(t_a)$.

The earlier time $t_a$ is chosen so that the time interval between this earlier time $t_a$ and the time of determination $t_e$ is at least equal to the time to alert TTA($t_a \le t_e - TTA$). Advantageously, the earlier time $t_a$ is chosen as the time nearest to the time of determination $t_e$ for which GPS data has been validated.

Thus, the first localization $L_1(t_e)$ is determined independently from any GPS data which has not yet been validated by positioning module 5. Thus, the first localization $L_1(t_e)$ of the aircraft at time $t_e$ is not affected by errors of GPS data which have only been detected later than time $t_e + TTA$.

The first localization $L_1(t_e)$ is determined by the localization module 9, as described hereafter.

According to the second mode of computation, the second localization $L_2(t_e)$ of the aircraft at a time of estimation $t_e$ is determined on the basis of inertial data at this moment $t_e$, and a correction $C_2(t_e)$ determined by hybridization from a deviation $e(t_a)$ recorded at time $t_a$ immediately prior to time $t_e$, so that $t_e - TTA < t_a \le t_e$, between the first positional information from the computer 13 at time $t_a$ and second positional information from the positioning module 5 at time $t_a$.

This second localization $L_2(t_e)$ is thus determined depending on GPS data which has not yet been validated by positioning module 5.

This second localization $L_2(t_e)$ is advantageously determined by means of a Kalman filter receiving the deviation $e(t_a)$ as input and delivering a correction $C_2(t_e)$ as output.

This second localization is determined by the inertial navigation center 3.

For this purpose, the inertial navigation center 3 comprises a hybridization unit 20, a switch 22, and a comparator 25.

The comparator 25, connected at the input to computer 13 and module 5, is adapted for determining at each time t a deviation e(t) between GPS position $p_{GPS}(t)$ and the inertial position $p_i(t)$: $e(t) = p_{GPS}(t) - p_i(t)$.

The hybridization unit 20 is connected at the input to comparator 25, and connected at the output to computer 13 and sensors 11.

The hybridization unit 20 is connected to comparator 25 via a switch 22 which can be switched between a closed position and an open position, the selection module 7 being adapted for controlling closing or opening of the switch 22 depending on the mode of computation chosen.

When the selection module 7 chooses the second mode of computation at time $t_e$, the switch 22 is in the closed position so that the hybridization unit 20 receives as input the deviation $e(t_a)$ between GPS position $p_{GPS}(t_a)$ and the inertial position $p_i(t_a)$ determined by the comparator 25 at time $t_a$ immediately prior to time $t_e$. The hybridization unit 20 is then adapted for providing the correction $C_2(t_e)$ as output, determined e.g. by means of a Kalman filter.

This correction $C_2(t_e)$ comprises a bias estimate of the sensors 11 and position enhancement data from which the computer 13 determines an inertial position $p_i(t)$ of the aircraft.

When the selection module 7 chooses the first mode of computation at time $t_e$, the switch 22 is in the open position, so that the hybridization unit 20 does not receive as input the deviation e(t) between the GPS position $p_{GPS}(t)$ and the inertial position $p_i(t)$ determined by the comparator 25. Thus, the sensors 11 and the computer 13 will receive non-updated correction values from the hybridization unit 20.

The localization module 9 is adapted for determining the first localization $L_1(t_e)$ of the aircraft at the time of estimation $t_e$ from the inertial position $p_i(t_e)$ and a deviation recorded at an earlier time $t_a$ between the GPS position and the inertial position, the time interval between this earlier time $t_a$ and the time of determination $t_e$ being at least equal to the time to alert TTA.

For this purpose, module 9 comprises a comparator 26 connected at the input to computer 13 and module 5, adapted for determining at each time t a deviation e(t) between the GPS position $p_{GPS}(t)$ and the inertial position $p_i(t)$:

$$e(t) = p_{GPS}(t) - p_i(t).$$

Module 9 further comprises a filter 28 connected at the input to the comparator 26, adapted for filtering the signal e(t) from the comparator 26 for canceling noise therefrom.

At the input, the filter 28 is connected to a sampler 30 adapted for sampling the filtered signal E(t) from filter 28 at a predetermined frequency $f_{ech} = 1/T_{ech}$, in order to provide a sampled deviation signal $E(kT_{ech})$. The sampling frequency $f_{ech} = 1/T_{ech}$ is for instance greater than 0.2 Hz.

As described hereafter, the deviation recorded at a time t is to be stored by module 9 for a storage duration at least equal to the time to alert TTA, then to be used at a time $t_e \ge t + TTA$ for correcting the value of the inertial position $p_i(t_e)$.

Thus, module 9 comprises a memory 32 adapted for storing each value of the sampled signal $E(kT_{ech})$ for a duration at least equal to the time to alert. Sampling of the deviation signal allows for the size of the memory 32 required for storage to be minimized.

Module 9 further comprises validation means 34 connected at the input to memory 32 and satellite positioning module 5, and connected at the output to a summer 36.

Validation means 34 is adapted for receiving from the satellite positioning module 5, at each time $kT_{ech} + TTA$, the associated protection limits of the GPS position $p_{GPS}(kT_{ech})$, and comparing such protection limits to the vertical and horizontal alert limits.

If the minimum vertical VPL and horizontal HPL precisions of the GPS position $p_{GPS}(kT_{ech})$ are lower than the vertical VAL and horizontal HAL alert limits, respectively, and if the GPS is operating in optimal mode ensuring the value of the time to alert, the GPS position $p_{GPS}(kT_{ech})$ at time $kT_{ech}$ is validated, so that the validation means 34 transmit the deviation $E(kT_{ech})$ determined at time $kT_{ech}$ between the GPS position and the inertial position to the summer 36, at time $kT_{ech} + TTA$.

Thus, in this embodiment, correction $C_1(t_e)$ is equal to deviation $E(kT_{ech})$.

If, however, the minimum vertical precision VPL and/or the minimum horizontal precision HPL is/are lower than the vertical VAL and/or horizontal HAL alert limit(s), respectively, and/or if the GPS is not operating in optimal mode, the GPS position $p_{GPS}(kT_{ech})$ at time $kT_{ech}$ is not validated, and the validation means 34 do not transmit the deviation $E(kT_{ech})$ to the summer 36.

The summer 36 is connected at the input to the computer 13 and the validation means 34. The summer 36 is adapted for determining the first localization $L_1(t_e)$ of the aircraft at the time of estimation $t_e$ from the inertial position $p_i(t_e)$ from the computer 13 at this moment $t_e$ and the last deviation value received from the validation means 34, as a sum of the inertial position $p_i(t_e)$ and the last deviation value received from the validation means 34.

Namely, if the GPS position $p_{GPS}(kT_{ech})$ at time $kT_{ech}$ is validated, for any time of estimation $t_e$ so that $kT_{ech}+TTA \le t_e < (k+1)T_{ech}+TTA$, the first localization is estimated as: $L_1(t_e) = p_i(t_e) + E(kT_{ech})$.

If, however, the GPS position $p_{GPS}(kT_{ech})$ at time $kT_{ech}$ is invalidated for any time of estimation $t_e$ so that $kT_{ech}+TTA \le t_e < (k+1)T_{ech}+TTA$, then the first localization is estimated as: $L_1(t_e) = p_i(t_e) + E(k'T_{ech})$ where $k' < k$.

Thus, the first localization is determined independently from any GPS data that has not yet been validated or has been invalidated.

Figure 2:
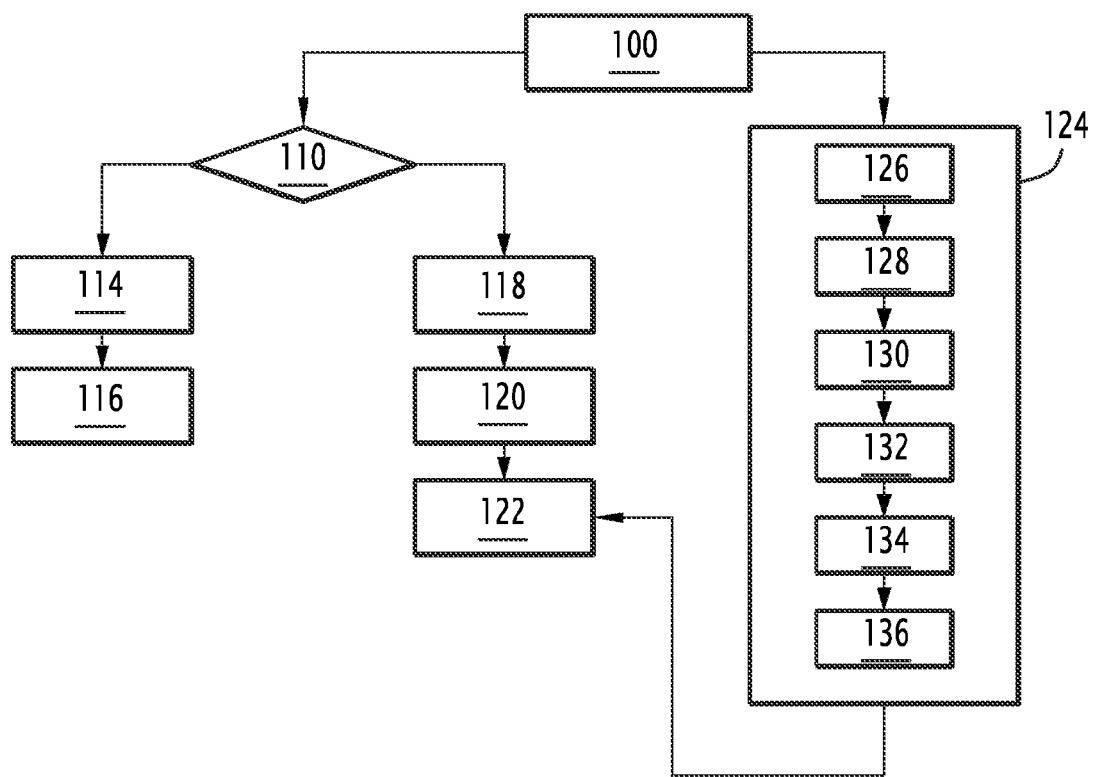
FIG. 2 is a synoptic diagram of a navigation assistance method implemented by the system of FIG. 1.

FIG. 2 shows an example of the implementation of the method according to the invention by means of the system of FIG. 1 for estimating a localization of the aircraft at a time $t_e$.

Hereafter, it is assumed that this time $t_e$ is a sampling time such as $t_e = nT_{ech}$.

In an acquisition step 100, the inertial navigation center 3 acquires inertial data, and the satellite positioning module 5 acquires GPS data, at time $t_e$.

Moreover, the satellite positioning module 5 receives GPS signals and SBAS signals and therefrom infers the GPS position of the aircraft $p_{GPS}(t_e)$ at time $t_e$.

Furthermore, in a selection step 110, the selection module 7 chooses the mode of computation to be used to determine the localization of the aircraft at time $t_e$.

For this purpose, selection module 7 determines, depending on the phase of flight of the aircraft at time $t_e$, if the time to alert is acceptable, or if, on the contrary, it is too long considering this phase of flight.

If the time to alert of the positioning module 5 is not acceptable, the selection module 7 chooses the first mode of computation.

If, however, the time to alert of the positioning module 5 is acceptable, the selection module 7 chooses the second mode of computation.

Then, depending on the mode of computation chosen by the selection module 7, the inertial navigation center 3 or the localization module 9 determines the localization of the aircraft at time $t_e$ from inertial information from the computer 13 and GPS data from the satellite positioning module 5.

If the second mode of computation is chosen, selection module 7 orders closing or maintaining the closed position of the switch 22, in step 114.

Hybridization unit 20 then receives as input the deviation $e(t_a)$ determined at a time $t_a$ immediately prior to time $t_e$, such as $t_e - TTA < t_a \le t_e$, $t_e - TTA < t_a \le t_e$, between first positional information from the computer 13 and second positional information from the positioning module 5, and determines a correction $C_2(t_e)$ from this deviation $e(t_a)$, in step 116.

This correction is transmitted to sensors 11 and computer 13 which will estimate the localization $L_2(t_e)$ of the aircraft from the inertial data and the correction $C_2(t_e)$.

If the first mode of computation is chosen, the selection module 7 orders switch 22 to be opened or maintained in the open position, in step 118.

Then, hybridization unit 20 does no longer receive as input the deviation $e(t_a)$ between the first positional information from the computer 13 and the second positional information from the positioning module 5.

Thus, hybridization unit 20 does no longer update the correction value $C2(te)$ to be applied to the inertial data. Thus, the computer 13 determines the inertial position of the aircraft $pi(te)$ at time te from inertial data and the last correction value $C2(te)$ determined by hybridization unit 20, in step 120.

Module 9 then determines the first localization $L1(te)$ of the aircraft at the time of estimation te in step 122, from the inertial position $pi(te)$ and a deviation recorded at an earlier time to between the GPS position and the inertial position, received from the validation means 34.

In step 122, the summer 36 determines the first localization $L_1(t_e)$ of the aircraft at the time of estimation $t_e$ from the inertial position $p_i(t_e)$ from the hybridization unit 20 at this moment $t_e$ and the last deviation value received from the validation means 34.

This last deviation value is equal to:

$E(kT_{ech})$, with $kT_{ech}+TTA \le t_e<(k+1)T_{ech}+TTA$, if the GPS position $p_{GPS}(kT_{ech})$ at time $kT_{ech}$ is validated;

$E(k'T_{ech})$, with $k'<k$ et $k'T_{ech}+TTA<t_e$, if the GPS position $p_{GPS}(kT_{ech})$ at time $kT_{ech}$ is invalidated, $k'T_{ech}$ being the time closest to $kT_{ech}$, the associated GPS position of which has been validated.

Thus, the first localization $L1(te)$ of the aircraft is estimated as: $L_1(t_e) = p_i(t_e) + E(kT_{ech})$ or $L_1(t_e) = p_i(t_e) + E(k'T_{ech})$.

In parallel, in step 124, module 9 stores a deviation recorded at time te between the GPS position pGPS(te) and the inertial position pi(te).

Step 124 includes a phase 126 of the comparator 26 determining a deviation $e(t_e) = p_{GPS}(t_e) - p_i(t_e)$ between the GPS position pGPS(te) and the inertial position pi(te).

Phase 126 is followed by a phase 128 of filtering the deviation e(te) by filter 28 for best possible noise cancelation, producing a filtered signal E(te).

The filtered signal E(te) is then sampled by the sampler 30 in phase 130. As the considered time te coincides with the sampling time nTech, the sampler 30)) provides a sampled value $E(nT_{ech}) = E(t_e)$ as output.

This phase is followed by a phase 132 of memory 32 storing the value $E(nT_{ech})$. This storage phase has a duration which is at least equal to the time to alert TTA.

Then, in a validation phase 134 implemented at time te+TTA, the validation means 34 receives, from the satellite positioning module 5, the protection limits associated with the GPS position pGPS(te), and compares such protection limits to the vertical and horizontal alert limits.

If the minimum vertical VPL and horizontal HPL precisions of the GPS position pGPS(te) are lower than the vertical VAL and horizontal HAL alert limits, respectively, and if the GPS is in optimal operating mode, the GPS position pGPS(te) at time te is validated, and the validation means 34 transmits the deviation $E(nT_{ech})$ determined at time te between the GPS position and the inertial position to the summer 36, at time te+TTA, in phase 136.

This deviation is then used by the summer 36 to determine the first localization L1(te+TTA) of the aircraft at the time of estimation te+TTA, in accordance with step 122.

If, however, the minimum vertical precision VPL and/or minimum horizontal precision HPL is/are lower than the vertical VAL and/or horizontal HAL alert limit(s), respectively, and/or if the GPS is not in optimal operating mode, the GPS position pGPS(te) at time te is not validated, and the validation means 34 do not transmit the deviation $E(nT_{ech})$ to the summer 36.

When the time to alert is not acceptable, the system and method according to the invention thus allow for a localization of the aircraft to be determined, which is not dependent on possibly erroneous GPS data, but which is still more precise than a localization which is only determined from inertial data.

Figure 3:
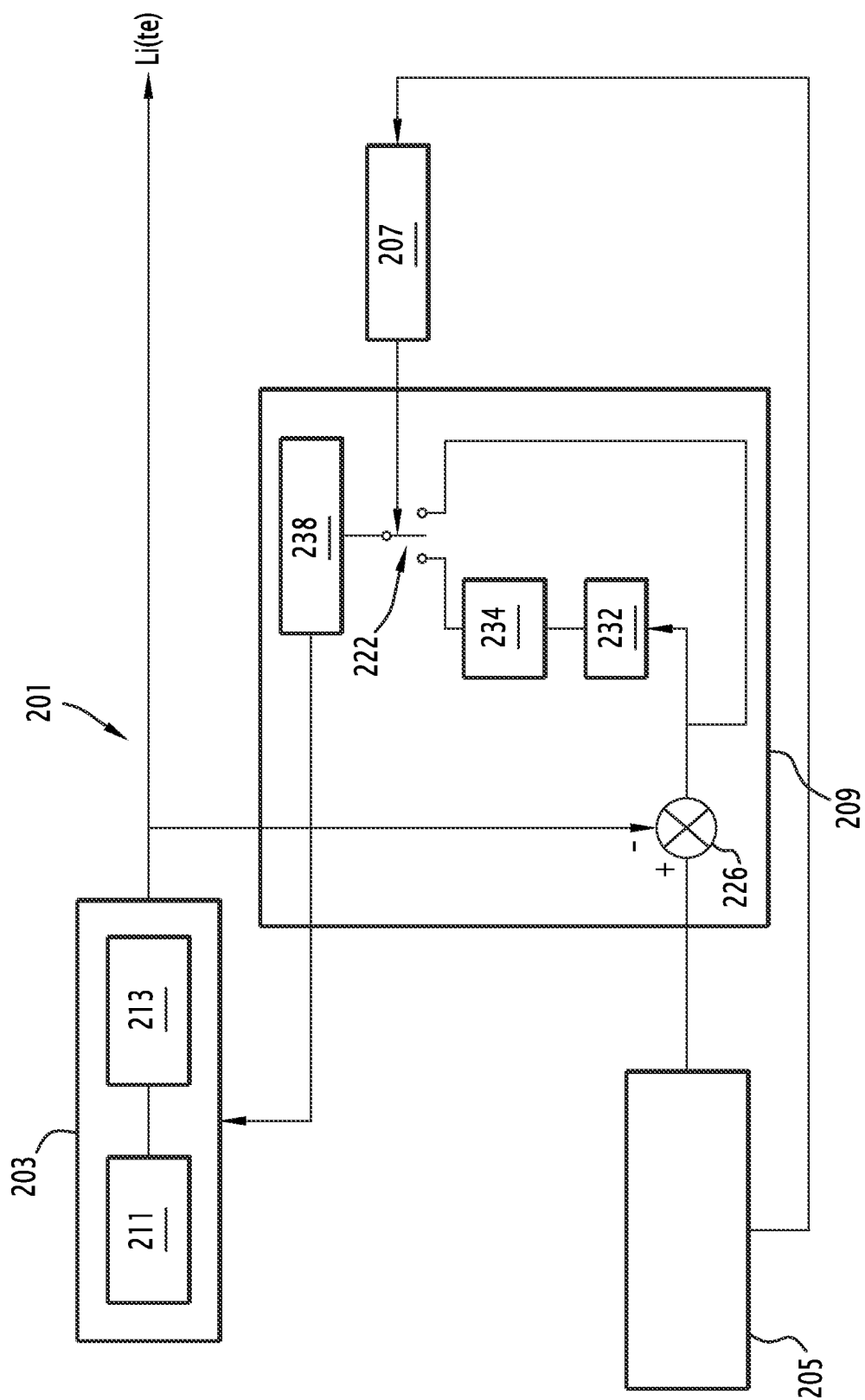
FIG. 3 is a diagram of a navigation assistance system according to a second embodiment of the invention.

FIG. 3 shows a system 201 according to a second embodiment of the invention.

System 201 includes an inertial navigation module 203 and a satellite positioning module 205.

System 201 further includes a selection module 207, similar to the selection module 7 of system 1, and a correction module 209.

According to this example, the inertial navigation module 203, the satellite positioning module 205, the selection module 207, and the correction module 209 are integrated into an inertial navigation center.

The inertial navigation module 203 comprises accelerometric and gyrometric sensors 211 and a computer 213.

The computer 213 is configured to determine first geographical positional and velocity of the aircraft from accelerometric and gyrometric measurements from the sensors 211.

Furthermore, the computer 213 is configured to determine a localization of the aircraft at a time of estimation te from such first positional information and a correction applied to such information. This correction, estimated at time t from the localization L1(t) or L2(t) estimated by the computer 213 at this moment t and GPS data, is intended to enhance precision of the determined localization over a localization estimated from inertial data only.

The inertial navigation module 205 is similar to the inertial navigation module 5 described with reference to FIG. 1.

Correction module 209 is adapted for determining a correction C'I to be applied to the inertial data from a localization Li estimated by the computer 213 and GPS data from the satellite positioning module 205. This correction $C'_I$ depends on the mode of computation chosen by the selection module 207.

According to the first mode of computation, the first localization L1(te) of the aircraft is determined at a time of estimation te on the basis of the inertial data at this moment te, and a correction C'1(te) determined from a deviation $e'(t_e)$ recorded at an earlier time ta, between the GPS position pGPS(ta) and the localization L1(ta) or L2(ta).

The earlier time ta is chosen so that the time interval between this earlier time ta and the time of determination te is at least equal to the time to alert TTA($t_a \leq t_e$-TTA). Advantageously, the earlier time ta is chosen as the time closest to the time of determination te for which the GPS data has been validated.

Thus, the first localization L1(te) is determined independently from any GPS data not yet validated by the positioning module 205. Thus, the first localization $L_1(t_e)$ of the aircraft at time $t_e$ is not affected by errors of the GPS data that would only be detected later on, at time $t_e$+TTA.

According to the second mode of computation, the second localization L2(te) of the aircraft at a time of estimation te is determined on the basis of the inertial data at this moment te, and a correction C'2(te) determined from a deviation $e'(t_a)$ determined at a time to immediately prior to time te, such as $t_e$-TTA<$t_a \leq t_e$.

This second localization L2(te) is thus determined depending on GPS data which has not yet been validated by the positioning module 205.

Hereafter, the localization estimated by the computer 213 will be designated as Li, with i=1 or 2 depending on the mode of computation chosen.

Correction module 209 comprises a comparator 226 connected at the input to the inertial navigation module 203 and the satellite positioning module 205, and adapted for determining at each time t a deviation e(t) between the GPS position pGPS(t) and the localization Li(t): $e'(t)=p_{GPS}(t)-L_i(t)$.

Correction module 209 further comprises a memory 232, a validation means 234, a switch 222, and a hybridization unit 238.

The memory 232, connected to an output of the comparator 226, is adapted for storing the deviation e'(t) for a duration at least equal to the time to alert TTA.

Validation means 234 is connected at the input to the memory 232 and the satellite positioning module 205.

Validation means 234 is adapted for receiving from the satellite positioning module 205, at each time t+TTA, the protection limits associated with the GPS position pGPS(t), and comparing such protection limits to the vertical and horizontal alert limits.

If the minimum vertical VPL and horizontal HPL precisions of the GPS position pGPS(t) are lower than the vertical VAL and horizontal HAL alert limits, respectively, the GPS position pGPS(t) at time t is validated. Validation means 234 then extract from memory 232 the deviation e'(t) recorded at time t between the GPS position and the inertial position and transmit this deviation to the hybridization unit 238 via switch 222.

If, however, the minimum vertical precision VPL and/or the minimum horizontal precision HPL is/are lower than the vertical VAL and/or horizontal HAL alert limit(s), respectively, the GPS position pGPS(t) at time t is not validated, and the validation means 234 does not transmit the deviation e'(t) to the hybridization unit 238.

Switch 222 includes two input terminals respectively connected to the validation means 234 and an output of the comparator 226, and one output terminal connected to an input of the hybridization unit 238. Switch 222 can be switched between a first and a second position, under the control of the selection module 207, depending on the mode of computation chosen by the module 207.

When the selection module 207 chooses the first mode of computation at a time of estimation te, switch 222 is switched into the first position, where the input of the hybridization unit 238 is connected to the validation means 234. The hybridization unit 238 then receives as input a deviation value $e'(t_a)$ recorded at a time $t_a$ prior to time $t_e$, such as $t_a \leq t_e$-TTA. Hereafter, this deviation will be designated as $e'_1(t_a)$.

When the selection module 207 chooses the second mode of computation, switch 222 is switched into the second position, where the input of the hybridization unit 238 is connected to the output of the comparator 226. The hybridization unit 238 then receives as input a deviation value $e'(t_a)$ recorded at a time ta such as $t_e$-TTA<$t_a \leq t_e$. Hereafter, this deviation will be designated as $e'_2(t_a)$.

Subsequently, $e'_i$ will designate the deviation received by the hybridization unit 238, with i=1 or 2 depending on the mode of computation chosen.

The hybridization unit 238 is adapted for determining the value of the correction Ci(te) from the deviation e'i(ta) received via switch 222, e.g. by means of a Kalman filter, and transmitting the value of this correction to the computer 213.

FIG. 4 shows a second sample implementation of the method according to the invention, by means of the system of FIG. 3, for estimating a localization of the aircraft at a time $t_e$.

In an acquisition step 300, similar to step 100 described with reference to FIG. 2, the inertial navigation module 203 acquires inertial data, and the satellite positioning module 205 acquires GPS data, at the time of estimation te.

Furthermore, in a selection step 310, similar to step 110 described with reference to FIG. 2, the selection module 207 chooses the mode of computation to be used for the determination of the localization of the aircraft at time te.

If the first mode of computation is chosen, the selection module 207 in step 312 switches the switch 222 into the first position.

The hybridization unit 238 is then connected to the validation means 234, and then receives as input a deviation value $e'_1(t_e)$ recorded at a time ta prior to time te, such as $t_a \le t_e - TTA$. This deviation value $e'_1(t_a)$ is the last deviation value transmitted by the validation means 234.

This last deviation value is equal to:
- $e'(t_e - TTA)$, if the GPS position $p_{GPS}(t_e - TTA)$ at time $t_e - TTA$ is validated;
- $e'(t_a)$, with $t_a < t_e - TTA$, if the GPS position $p_{GPS}(t_e - TTA)$ at time $t_e - TTA$ is invalidated, $t_a$ being the time closest to $t_e - TTA$, the associated GPS position of which has been validated.

If the second mode of computation is chosen, the selection module 207 in step 314 switches the switch 222 into the second position.

The hybridization unit 238 is then connected to the output of the comparator 226, and then receives as input a deviation value $e'hd 2(t_a)$ recorded at a time ta immediately prior to time te, such as $t_e - TTA < t_a \le t_e$.

In step 315, the hybridization unit 238 determines a correction value C'i(te) from the deviation value $e'_I$ received in step 312 or 314.

Then, in step 316, the computer 213 receives the correction value C'i(te) thus determined from the hybridization unit 238, and estimates a localization Li(te) of the aircraft from inertial data and correction C'i(te).

If the first mode of computation is chosen, this localization $L_i(t_e) = L_1(t_e)$ is determined from inertial data at time $t_e$ and a correction $C'_1(t_e)$ determined from a deviation recorded between a localization and validated GPS data, thus independently from any GPS data that has not been validated by the positioning module 205.

According to the second mode of computation, the second localization L2(te) of the aircraft at a time of estimation te is determined on the basis of the inertial data at this moment te, and a correction C'2(te) determined from a deviation $e'(t_a)$ determined at a time to immediately prior to time te, such as $t_e - TTA < t_a \le t_e$.

This second localization L2(te) is thus determined depending on GPS data which has not yet been validated by the positioning module 205.

In parallel, the correction module 209 stores in step 320 a deviation $e'(t_e)$ recorded at time te between the GPS position pGPS(te) and the localization Li(te).

Step 320 includes a phase 326 of the comparator 226 determining a deviation $e'(t_e) = p_{GPS}(t_e) - L_i(t_e)$ between the GPS position $p_{GPS}(t_e)$ and the localization $L_i(t_e)$.

This phase 326 is followed by a phase 332 of memory 232 storing the value $e'(t_e)$ for a duration at least equal to the time to alert TTA.

Next, in a validation phase 334 implemented at time te+TTA, the validation means 234 receives from the satellite positioning module 205 the protection limits associated with the GPS position pGPS(te), and compares these protection limits to the vertical and horizontal alert limits.

If the minimum vertical VPL and horizontal HPL precisions of the GPS position pGPS(te) are lower than the vertical VAL and horizontal HAL alert limits, respectively, the GPS position $p_{GPS}(t_e)$ at time $t_e$ is validated, and the validation means 234 then extracts from memory 232 the deviation $e'(t_e)$ determined at time $t_e$ and transmits this deviation to switch 222 toward the hybridization unit 238, in phase 336.

This deviation e'(te) is then used by the hybridization unit 238 to determine a new correction value, in accordance to step 315.

If, however, the minimum vertical precision VPL and/or the minimum horizontal precision HPL is/are lower than the vertical VAL and/or horizontal HAL alert limit(s), respectively, the GPS position pGPS(te) at time te is not validated, and the validation means 234 does not transmit the deviation e'(te) to switch 222.

It is to be understood that the sample embodiments presented above are not to be restrictive.

Namely, according to a variant of the system according to the first embodiment, the system 1 comprises several redundant inertial navigation modules, each adapted for providing inertial data. Such inertial data can be consolidated so as to provide consolidated inertial data from which the localization module 9 determines the localization of the aircraft.

Alternatively, the localization module 9 determines a localization of the aircraft from inertial data from each inertial navigation module, and the locations thus determined are consolidated so as to provide a localization of the aircraft.

Furthermore, the positioning module 5 can be different from a GPS/SBAS module, e.g. a standard GPS or coupled with a GBAS-type (for Ground Based Augmentation System) augmentation system.

Of course, other embodiments can be envisaged, and the technical features of the embodiments and variants mentioned above can be combined with each other.

The invention claimed is:

1. A navigation assistance system to be used on board an aircraft, comprising:
    an inertial navigation module, adapted for providing first aircraft positional information resulting at least partially from accelerometric and gyrometric measurements,
    a satellite positioning module, comprising at least one satellite navigation data receiver, said positioning module being adapted for determining second aircraft positional information from satellite positioning data received by said satellite navigation data receiver, said system comprising estimation means adapted for estimating a first localization of the aircraft at a given time of estimation on the basis of:
    first aircraft positional information, resulting at least partially from accelerometric and gyrometric measurements at said time of estimation, and
    second aircraft positional information, determined from satellite positioning data received by said satellite navigation data receiver prior to said time of estimation, said first localization being determined independently from any satellite positioning data received in a predetermined time interval preceding said time of estimation and including said time of estimation, said predetermined time interval being advantageously equal to a time to alert,
    wherein said satellite positioning module comprises means for validating or invalidating said satellite positioning data, depending on the precision of said satellite positioning data and/or depending on the operating mode of said satellite positioning module, wherein the second aircraft positional information includes an estimate of a position of the aircraft at least at a given time of determination and an estimate of a precision of said position, determined from satellite positioning data, and in that said satellite positioning module is adapted for comparing the estimate of the precision of said position to a required minimum precision at said time of determination, and validating said satellite positioning data, at a validation time after said time of determination, if the estimate of the precision of said position is in accordance with said required minimum precision, the time interval between said time of determination and said validation time being less or equal to said time to alert.

2. The navigation assistance system according to claim 1, wherein said first localization is determined independently from any satellite positioning data which has not been validated by said satellite positioning module.

3. The navigation assistance system according to claim 1, comprising a unit for storing a deviation recorded at an earlier time between first aircraft positional information and second aircraft positional information, adapted for storing said deviation (e) at least between said earlier time and said time of estimation:

said estimation means being adapted for determining said first localization of the aircraft at said time of estimation:
depending on the deviation recorded at said earlier time if said satellite positioning data at said earlier time is validated, or
depending on a deviation recorded at the last time for which satellite positioning data has been validated, if said satellite positioning data at said earlier time is not validated.

4. The navigation assistance system according to claim 1, comprising a unit for storing a deviation recorded at an earlier between second aircraft positional information and a first localization determined at said earlier time by said estimation means, said storage unit being adapted for storing said deviation at least between said earlier time and said time of estimation, said estimation means being adapted for determining said first localization of the aircraft at said time of estimation:
depending on the deviation recorded at said earlier time if said satellite positioning data at said earlier time is validated, or
depending on a deviation recorded at the last time for which satellite positioning data has been validated, if said satellite positioning data at said earlier time not validated.

5. The navigation assistance system according to claim 1, wherein said estimation means is adapted for determining a second localization of the aircraft at the time of estimation, on the basis of hybridization between:
first positional information of the aircraft resulting at least partially from accelerometric and gyrometric measurements at said time of estimation; and
second positional information of the aircraft determined from satellite positioning signals received by said satellite navigation data receiver at said time of estimation.

6. The navigation assistance system according to claim 5, comprising a selection module adapted for determining an enhanced-reliability localization of the aircraft, at a time of estimation associated with a predetermined requirement of responsiveness, said localization with enhanced reliability being:

equal to said first localization if said time to alert is not in accordance with said requirement of responsiveness; and
equal to said second localization if said time to alert is in accordance with said requirement of responsiveness.

7. The navigation assistance system according to claim 1, wherein said satellite positioning module comprises means of receiving differential positioning signals and signals from an SBAS-type system enhancing the precision of the positioning.

8. The navigation assistance system according to claim 1, wherein said first localization of the aircraft is estimated on the basis of hybridization between said first positional information of the aircraft and said second positional information of the aircraft.

9. A method of aircraft navigation assistance, comprising, in at least a first phase of flight of the aircraft, a step of estimating a first localization of the aircraft at a given time of estimation comprising:

a phase of determining first positional information of the aircraft, resulting at least partially from accelerometric and gyrometric measurements of an inertial navigation center at said time of estimation;
a phase of determining second positional information of the aircraft, from satellite positioning data received by a satellite navigation data receiver prior to said time of estimation;
a phase of estimating said first localization of the aircraft on the basis of said first and second positional information, said first localization being estimated independently from any satellite positioning data received at a predetermined time interval preceding said time of estimation and including said time of estimation, said predetermined time interval being advantageously equal to a time to alert; and
validating said satellite positioning data, depending on the precision of said satellite positioning data and/or depending on the operating mode of said satellite positioning module,
wherein the phase of determining second positional information comprises an estimate of a position of the aircraft at least at a given time of determination and an estimate of a precision of said position from said satellite positioning data, said validation step comprising a phase of comparing the estimate of the precision of said position to a required minimum precision at said time of determination, said satellite positioning data being validated, at a validation time after said time of determination, if and only if the estimate of the precision of said position is in accordance with said required minimum precision, the time interval between said time of determination and said validation time being less or equal to said time to alert.

10. The method according to claim 9, wherein said first localization is determined independently from any satellite positioning data not validated.

11. The method according claim 9, comprising, in at least a second phase of flight of the aircraft, a step of estimating a second localization of the aircraft at the time of estimation, on the basis of hybridization between:
first positional information of the aircraft resulting at least partially from accelerometric and gyrometric measurements at said time of estimation; and
second positional information of the aircraft determined from satellite positioning signals received by said satellite navigation data receiver at said time of estimation.

* * * * *